W. McCLAVE.
MECHANICAL MOVEMENT FOR AUTOMATIC STOKERS.
APPLICATION FILED JAN. 31, 1910.

988,275.

Patented Mar. 28, 1911.

5 SHEETS—SHEET 1.

W. McCLAVE.
MECHANICAL MOVEMENT FOR AUTOMATIC STOKERS.
APPLICATION FILED JAN. 31, 1910.

988,275.

Patented Mar. 28, 1911.

5 SHEETS—SHEET 2.

Witnesses
J. M. Fowler Jr.
H. Strauss

Inventor
William McClave,
By Mason Fenwick & Lawrence,
Attorneys

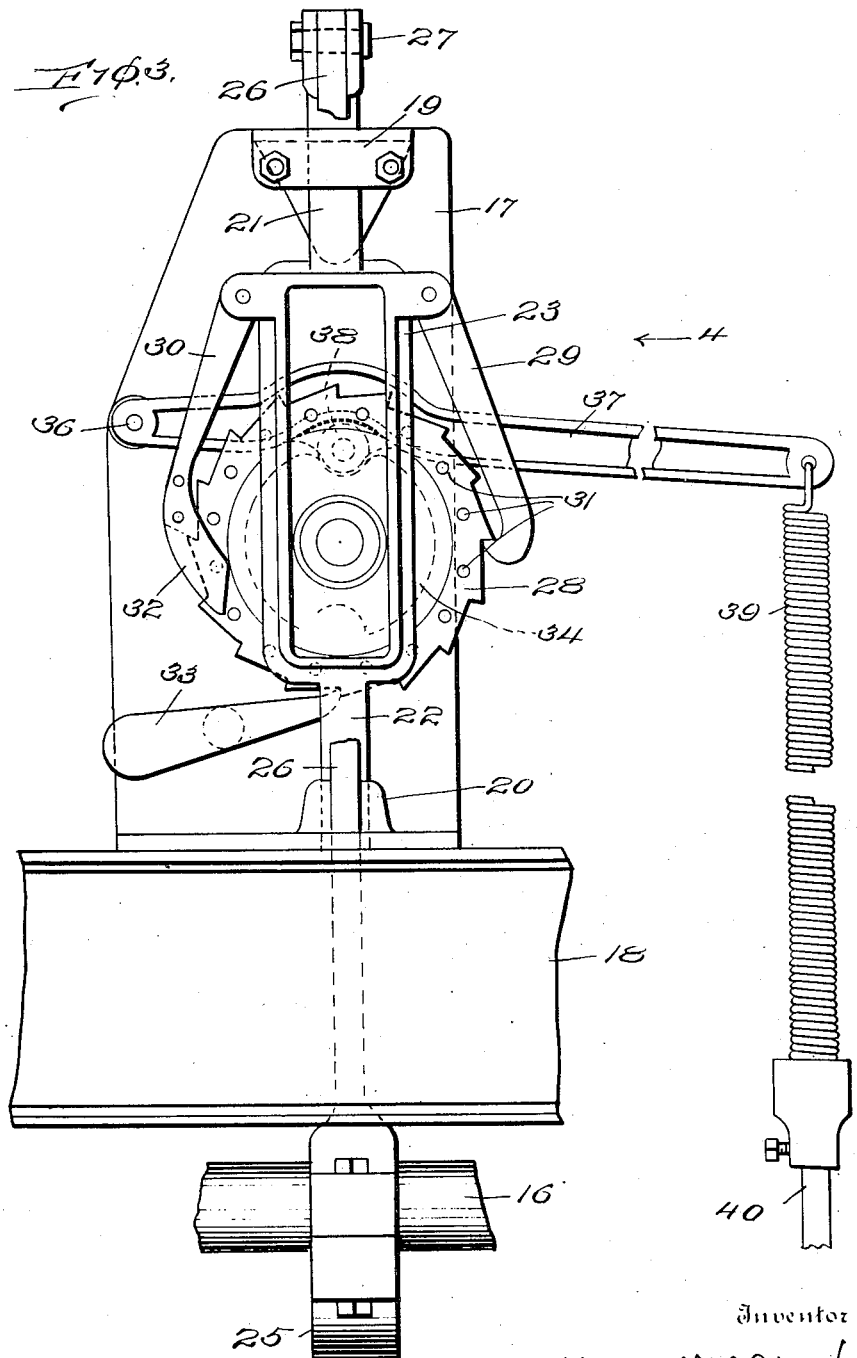

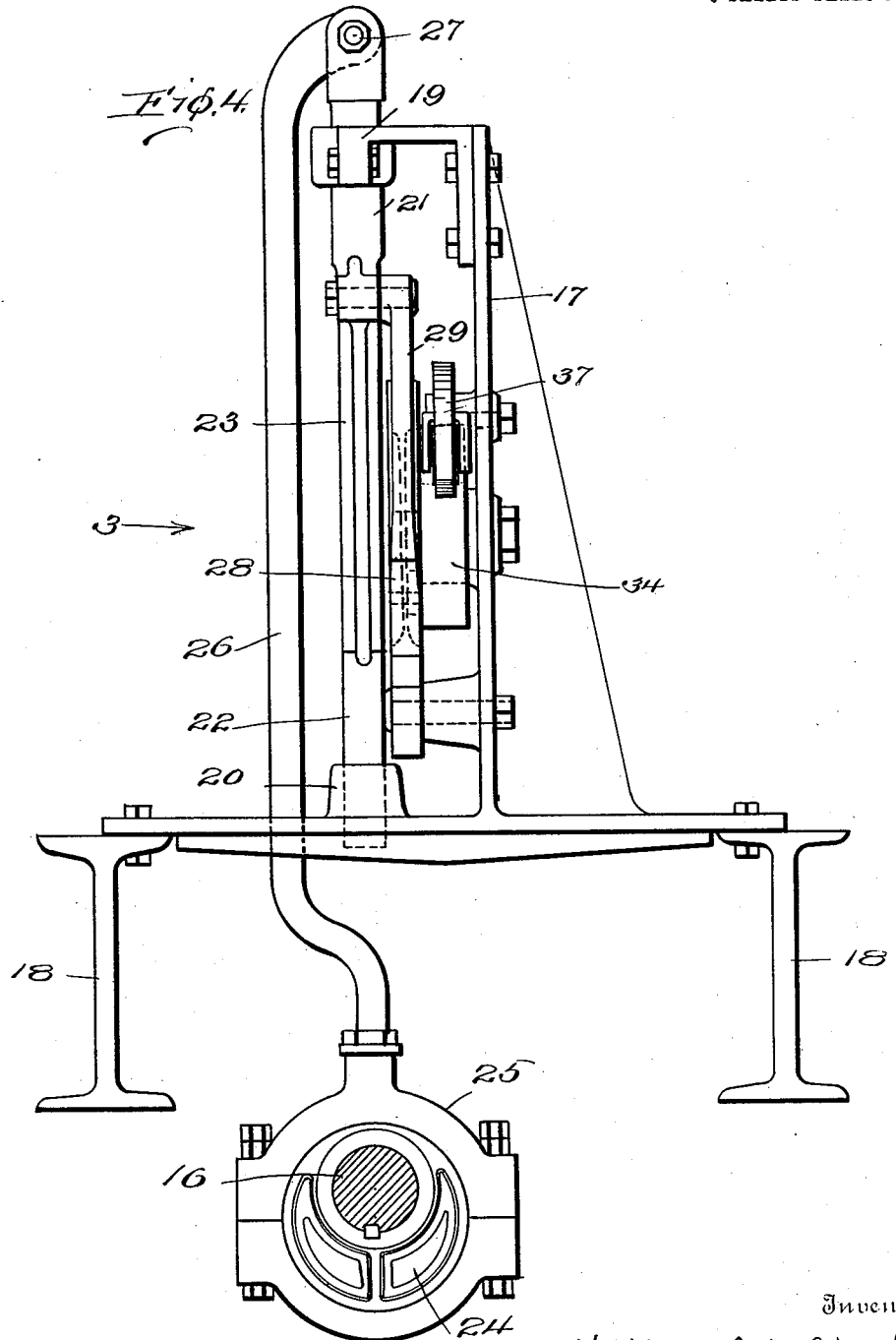

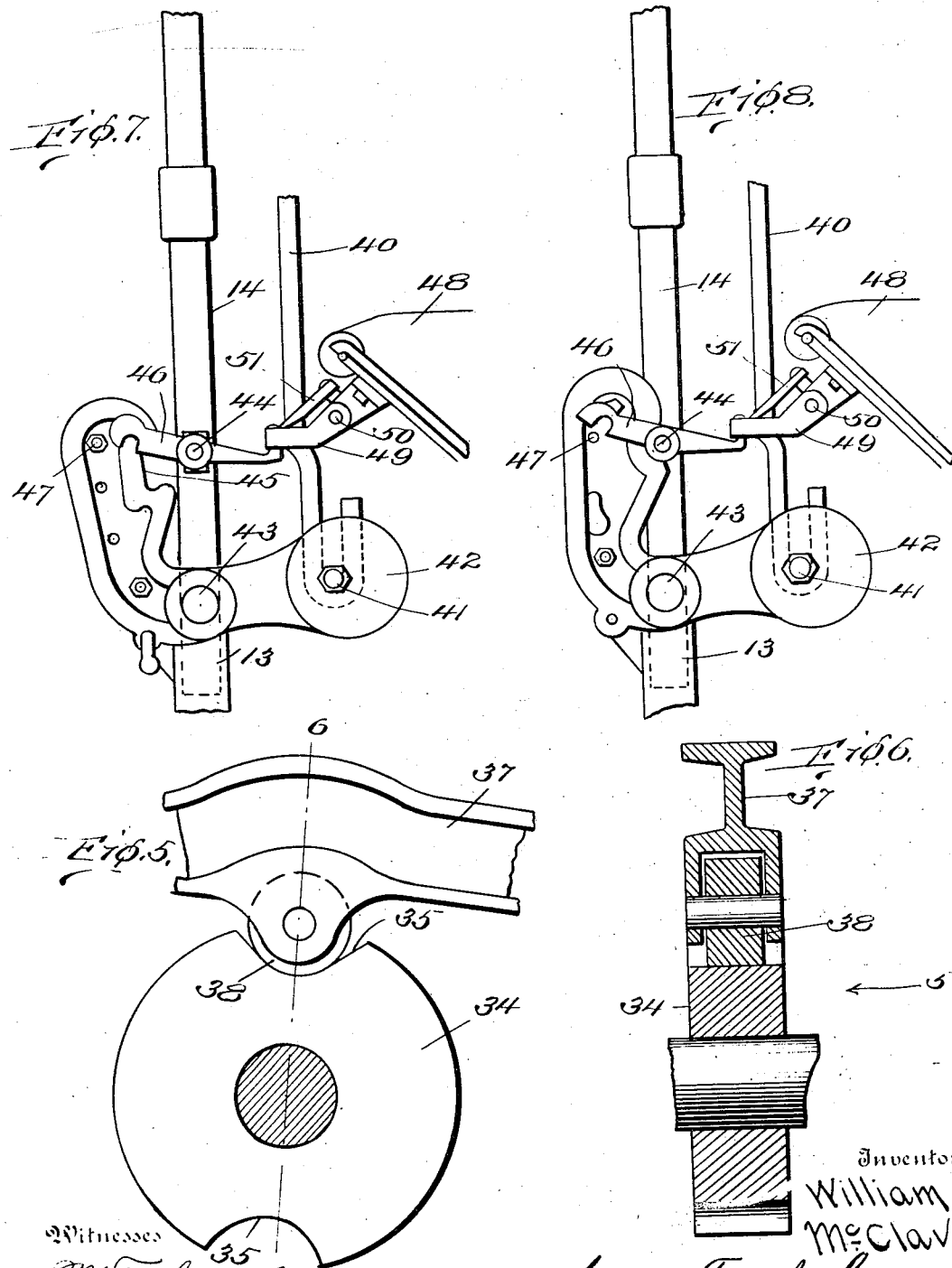

UNITED STATES PATENT OFFICE.

WILLIAM McCLAVE, OF SCRANTON, PENNSYLVANIA, ASSIGNOR TO McCLAVE-BROOKS COMPANY, OF SCRANTON, PENNSYLVANIA, A CORPORATION OF PENNSYLVANIA.

MECHANICAL MOVEMENT FOR AUTOMATIC STOKERS.

988,275. Specification of Letters Patent. Patented Mar. 28, 1911.

Original application filed September 30, 1909, Serial No. 520,296. Divided and this application filed January 31, 1910. Serial No. 541,062.

To all whom it may concern:

Be it known that I, WILLIAM McCLAVE, a citizen of the United States, residing at Scranton, in the county of Lackawanna and State of Pennsylvania, have invented certain new and useful Improvements in Mechanical Movements for Automatic Stokers; and I do hereby declare the following to be a full, clear, and exact description of the invention, such as will enable others skilled in the art to which it appertains to make and use the same.

This invention relates to mechanical movements, and especially to movements adapted for producing intermittent motion, and has for an object to provide an improved device of the class.

An object of the present invention is to produce an intermittent motion mechanism adapted for driving intermittently and alternately a plurality of separate mechanisms as for instance stokers and is a division of application Serial Number 520,296, filed September 30, 1909, for stoker.

A further object of the invention is to provide in conjunction with a line shaft a plurality of intermittent mechanisms driven from such line shaft with means for varying the intervals of operation of the several mechanisms to operate in series and at predetermined time intervals.

A further object of the invention is to provide a telescoping plunger or pitman rod section and a guiding section with means as a line shaft for continually reciprocating one of the sections and means also driven from the line shaft for intermittently locking together the sections to produce a single reciprocation of the connected sections.

With these and other objects in view, the invention comprises certain novel constructions, combinations and arrangements of parts, as will be hereinafter fully described and claimed.

Figure 1:
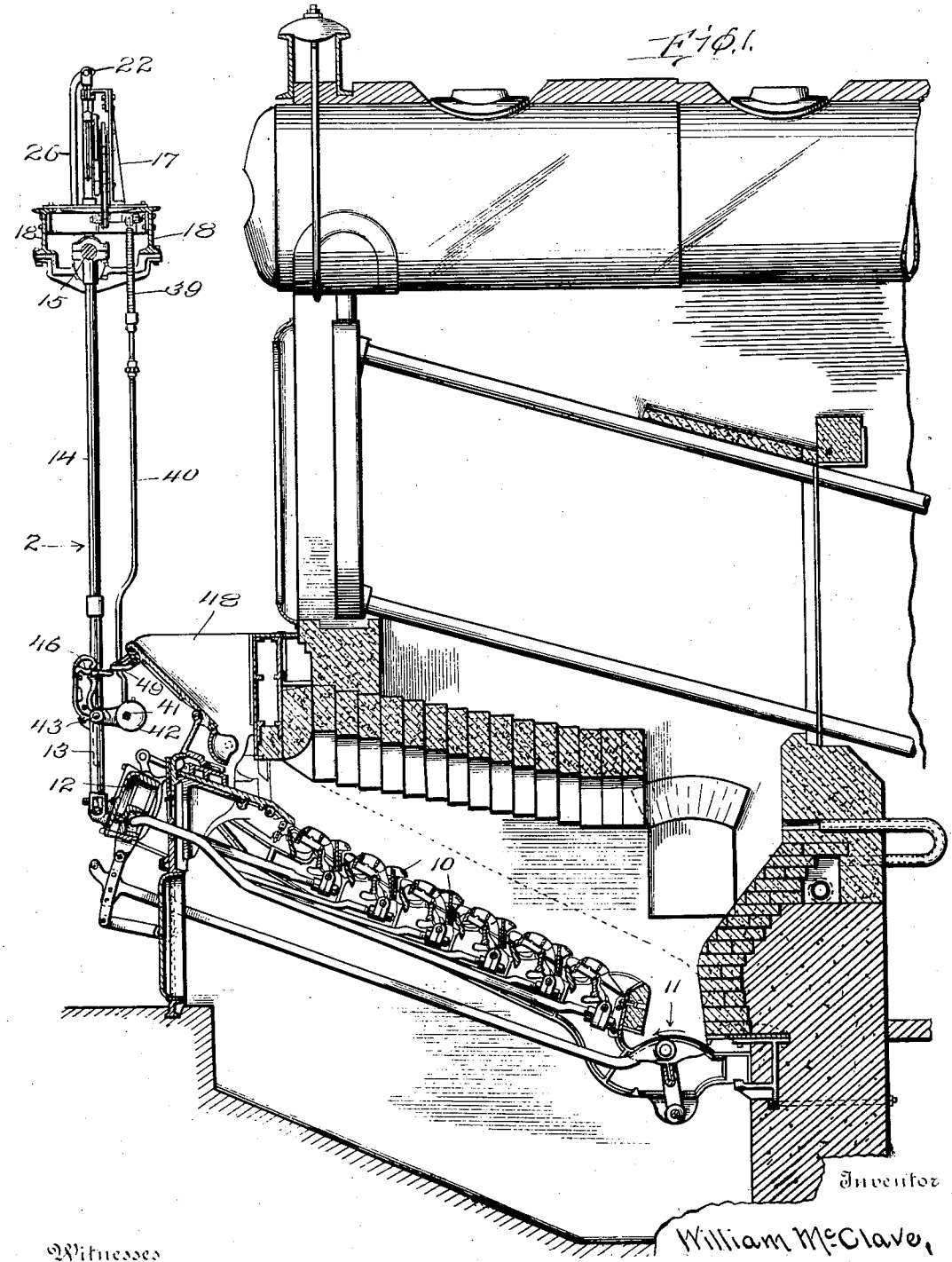
Figure 2:
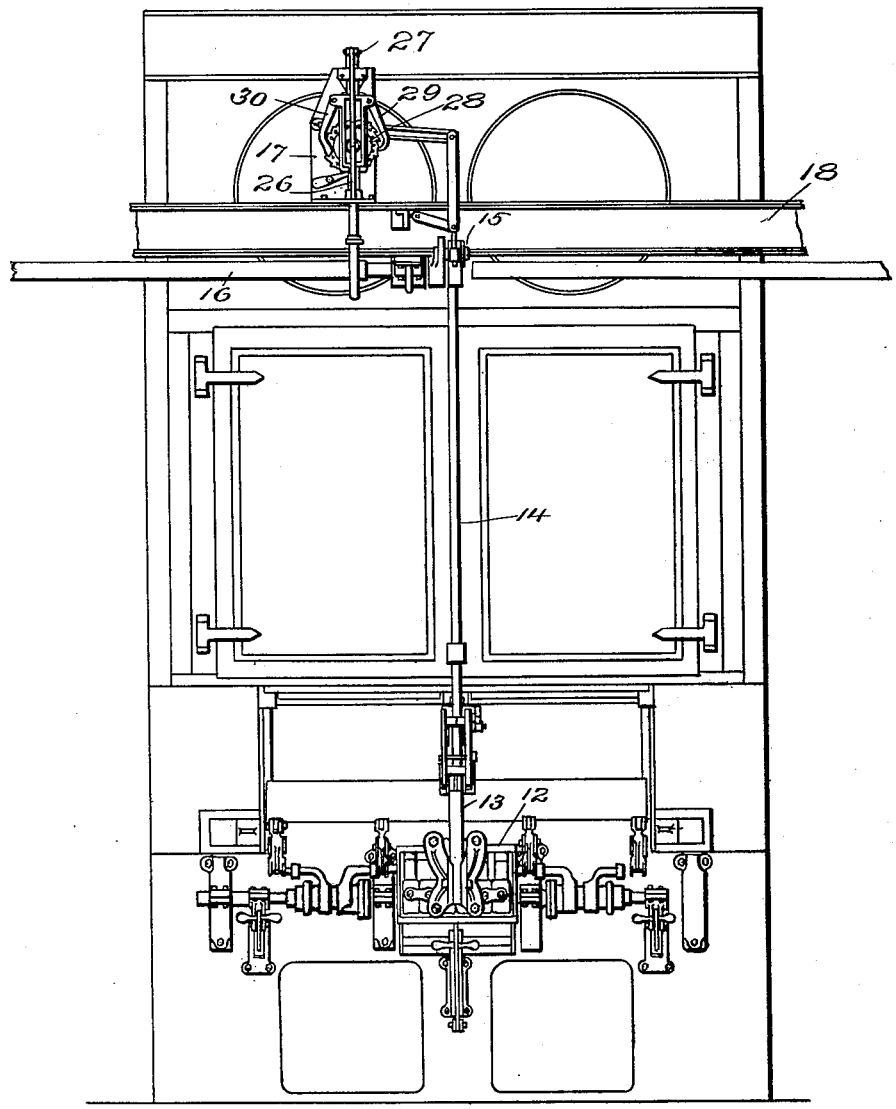

In the drawings:—Figure 1 is a view of the improved mechanism in end elevation shown in conjunction with a mechanical stoker as illustrated in said co-pending application No. 520,296. Fig. 2 is a view in front elevation of the improved intermittent mechanism shown associated with a stoker as indicated by arrow 2 in Fig. 1. Fig. 3 is a view of the ratchet mechanism and operating parts adapted to produce locking motion between the guiding section and pitman rod section. Fig. 4 is a view of the ratchet mechanism in end elevation as indicated by arrow 4 at Fig. 3 and also showing arrow 3 to indicate the position of Fig. 3. Fig. 5 is a view in side elevation of the cam and a fragment of the lever adapted for operating the locking mechanism. Fig. 6 is a transverse sectional view of the cam and lever taken at line 6—6 of Fig. 5 and also showing arrow 5 to indicate the position of Fig. 5. Fig. 7 is a view in elevation of the means for locking together the pitman rod section and guiding section. Fig. 8 is a view in side elevation of a slightly modified form of pitman rod section locking mechanism.

Like characters of reference designate corresponding parts throughout the several views.

At Figs. 1 and 2 the intermittent motion mechanism which forms the subject-matter of this application is shown in conjunction with a mechanical stoker having rocking bars 10 and ash pocket 11 operated from a rocking frame 12 all as disclosed in said co-pending application #520,296, and forming the subject-matter of said application of which this is a division.

Pivoted to the rocking frame 12 is a hollow guiding section 13 into which telescopes a plunger or pitman rod section 14 driven from a wrist pin 15 carried upon the line shaft 16 which is constantly driven to produce a constantly reciprocatory movement of the pitman rod section 14 within the section 13 except when such parts are locked together in the manner hereinafter described. Adjacent the wrist pin 15 a frame 17 is erected upon the supporting beams 18 providing guideways 19 and 20 in which is mounted to reciprocate respectively trunnions 21 and 22 carrying between them a frame 23. To produce the reciprocation of the frame 23 an eccentric 24 is mounted upon the line shaft 16 with an eccentric band 25 engaging such eccentric and connected by means of a rod 26 with the trunnion 21 as at 27. It will be apparent that as the line shaft 16 rotates to produce reciprocatory movement of the pitman rod section 14 the rod 26 is also reciprocated from the eccentric 24 to reciprocate the frame 23.

Journaled upon the frame 17 is a ratchet wheel 28 which is engaged upon one side by a pawl 29 and upon the opposite side by a pawl 30 both of which are pivotally secured to opposite sides of the frame 23. It will be noted that the pawls 29 and 30 are so arranged that they alternately engage the teeth of the ratchet wheel 28 to produce a step by step movement in the same direction with each half reciprocation of the frame 23. About the periphery of the ratchet wheel 28 a plurality of sockets 31 are formed into which may be inserted pins which will engage a plate 32 secured to the side of the ratchet 30 so that when one of the pins is in engagement with such plate the pawl 30 is held out of engagement with the ratchet 28 and to miss a stroke. By the insertion of a predetermined number of pins into the sockets 31 the step by step movement of the ratchet wheel 28 may be varied at will. To prevent return movement of the ratchet wheel 28 a pawl 33 is employed which engages in the rear of the teeth of the ratchet wheel 28 as they pass.

Rigidly connected with the ratchet wheel 28 is a cam 34 having any desired number of depressions in its periphery here shown as two at 35. Pivoted upon the frame 17 as at 36 is a lever 37 carrying a roller 38 in such position that when the recesses 35 are uppermost the roller 38 drops into such recesses dropping therewith the extremity of the lever 37 to which is pivoted a spring 39. The spring 39 is connected with a rod 40 which extends downwardly adjacent the pitman rod section 14 and is pivotally connected as at 41 to a weight 42 forming the extremity of a bell crank lever pivoted as at 43 to the guiding section 13. The pitman rod section 14 is provided with a pintle 44 positioned to be engaged within the recess 45 in one arm of the bell crank lever and also to form the pivot of a pawl 46 adapted to engage a pintle 47 to hold such bell crank lever in engagement with the pintle 44.

Secured to any convenient stationary structure here shown as a hopper 48 is a finger 49 positioned to engage the extremity of the pawl 46 to throw it out of engagement with the pintle 47. The finger 49 is pivoted as at 50 with a latch 51 adapted to hold such finger in operative position but to permit it to be swung out of operative position when it is desired to reciprocate the working parts a greater number of times than normal.

It will be apparent that the rotation of the line shaft 16 will cause a continual reciprocation of the pitman rod section 14 and a step by step movement of the ratchet wheel 28, which upon being sufficiently rotated and rotating therewith the cam 34 will permit the lever 37 to drop thereby dropping the rod 40 and permitting the weight 42 to throw the bell crank lever into engagement with the pintle 44 thereby locking together the guiding section 13 and the pitman rod section 14. It will be apparent also that the next half revolution of the line shaft 16 will cause the cam 34 to rotate a step to lift the lever 37, which said lifting action will be against the tension of the spring 39. Such tension of the spring 39 will tend to lift the rod 40 and weight 42 as soon as the upward reciprocation of the combined pitman rod section and the guiding section brings the pawl into engagement with the finger 49 to release said pawl from engagement with the pintle 47. It will, therefore, be apparent that at the contact of the pawl 46 with the finger 49 the spring is permitted to act upon the rod 40 to unlock the pitman rod section from the guiding section. It will, therefore, be apparent that the sections operate as a combined plunger or pitman rod only for a single reciprocation unless the finger 49 is moved out of the path of movement of the pawl 46 in which event the pawl is not disengaged and the sections remain locked together until unlocked.

When used in conjunction with a stoker as illustrated it will be apparent that the motive power required to operate the device will be that required for giving the proper action to a single stoker and that such action is taking place but a small fraction of the time for each stoker so that several stokers or other mechanical devices which are operated from the intermittent mechanism may be connected in series and operated from a single line shaft and so timed that they operate in series thereby operating the entire number of stokers or other devices with power only sufficient to operate a single one.

What I claim is:—

1. A device of the character described provided with a movable shaft, a pitman rod section connected with the movable shaft and reciprocated thereby, a guiding section designed to be at times operated by said pitman rod section, a lock carried by the guiding section adapted to at times engage with the pitman rod section for causing both mentioned sections to move at the same time, means for causing the lock at times to connect said sections, and a stationary structure positioned so as to engage the lock and unlock the sections upon a predetermined movement thereof.

2. A device of the class described provided with a movable part, a guiding section pivotally connected with the movable part, a pitman rod section movable independently of the guiding section, a constantly moving part transmitting motion to the pitman rod section, a lock mechanism carried by one of the sections, and means operated from the constantly moving part adapted to maintain the lock normally in unlocked position but to permit it intermittently to lock the sections together.

3. The combination with a movable part, of a guiding section connected with the movable part, a pitman rod section movable independently relative to the guiding section, a lock carried by one of the sections adapted to engage with the other section and lock the two sections together, means to reciprocate the pitman rod section, a cam, means to rotate the cam with a step by step movement, means supported upon the cam to hold the lock in normally unlocked position, and means adapted to actuate the lock when the cam reaches a predetermined point in its revolution.

4. In a device of the class described, a constantly rotating shaft, a movable part, a pitman rod section continuously reciprocated by the shaft, a cam, means to transmit motion from the rotating shaft to rotate the cam with a step by step movement, a lever supported upon the cam, means whereby when the lever is dropped by the cam the pitman rod section is locked to the movable part, means permitting the cam to oscillate the lever without unlocking said movable part and said pitman rod, and means independent of the cam and lever for unlocking the pitman rod.

5. In a device of the class described, a rotating shaft, a pitman rod section continuously reciprocated by the rotating shaft, a guiding section, a lock carried by one of the sections adapted to engage with the other section, a cam, means to rotate the cam from the rotating shaft with a step by step movement, means supported by the cam to hold the lock normally in unlocked position means whereby when such supporting mean is dropped by the cam the lock locks th sections together, means whereby the sup porting means may be raised by the can without unlocking the locked sections, an independent means for unlocking the locke sections upon the completion of a singl reciprocation.

6. In a device of the class described, pitman rod section, a guiding section, a loc for connecting said sections, means for mov ing said guiding section, a link connecte with said lock for operating said lock, spring connected with said link, a lever ar ranged to bring said spring under tensior and a cam designed to operate said link, th interposition of said spring between sai lever and said link permitting the lever t be raised without raising the link.

7. In a device of the class described, a intermittently movable guiding section, continuously movable pitman rod sectior locking means for locking said sections t gether at predetermined intervals, a lin connected with said locking means for cor trolling the same, a lever for conveying m tion to said link, a spring interposed b tween said lever and said link, and a ca member for moving said lever.

In testimony whereof I affix my signatu in presence of two witnesses.

WILLIAM McCLAVE.

Witnesses:
ROBT. J. MURRAY,
MADGE JENKINS.